April 22, 1969

N. E. PRESCOTT 3,440,404

ELECTRIC STOVE

Filed July 20, 1967

NORMA E. PRESCOTT
INVENTOR.

BY

ATTORNEY

3,440,404
ELECTRIC STOVE
Norma E. Prescott, 5080 Fieldwood Drive,
Houston, Tex. 77027
Filed July 20, 1967, Ser. No. 654,872
Int. Cl. F27d 11/02
U.S. Cl. 219—432      3 Claims

ABSTRACT OF THE DISCLOSURE

An electric stove having utensil receiving wells and electrical connections to receive electrically heated utensils and means for selectively determining the degree of heat to be attained in said utensils.

Summary of the invention

An electric stove having a table top with wells formed therein and shaped to provide easy access thereto in the receipt of electrically heated utensils, with a bar adjacent said wells having female electrical connection sockets in which the male connection members on the utensils may be received to complete an electrical connection, and rheostat controls on a remote panel for selectively determining the degree of heat to be attained by each utensil so connected, and said stove having one additional well in which standard electric burner equipment is located.

Description of the preferred embodiments

Figure 1:
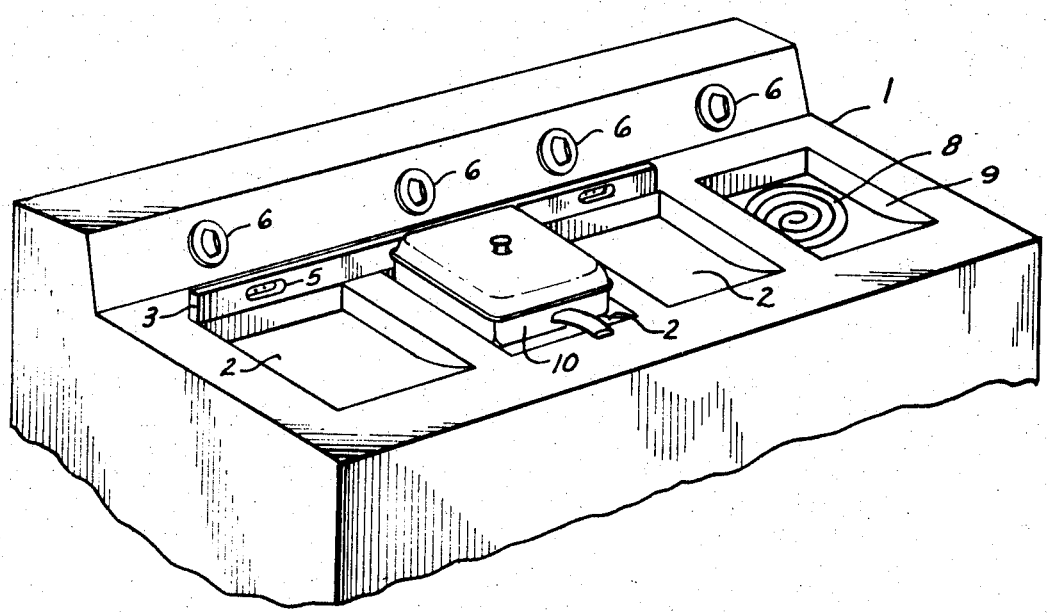
FIGURE 1 is a front perspective view of the device, showing one utensil mounted in a well.
Figure 2:
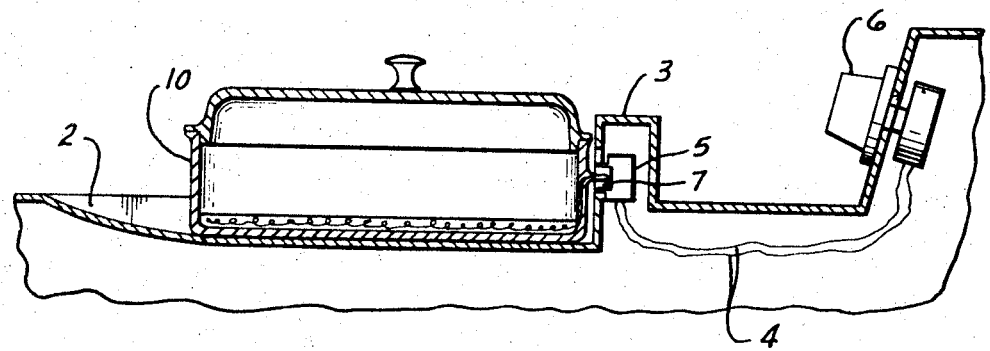
FIGURE 2 is a side elevational view in cross section, of one of the utensil wells showing a utensil mounted therein.

In the drawings the numeral 1 designates a table top stove of the desired size in which a series of utensil wells 2, 2 are formed. A bar 3 is mounted on the table top 1 in which the electrical wiring 4, 4 is mounted, having the female connections 5, 5 adjacent each well 2. Rheostat controls 6, 6 are provided to selectively determine the degree of heat to be attained by utensils mounted in the wells 2, 2. The wells 2, 2 are provided with an inclined area in the floors thereof to facilitate the entrance and removal of the utensils.

Electrically operated utensils, having electric heating elements built into the utensil such as in the conventional electric skillet, are provided. The utensil, as 10, is provided with the male connection 7, anchored to the back wall of the utensil, which is adapted to be inserted into the female connections 5 adjacent a selected well, completing the cooking unit. If desired, a standard electric burner 8 may be provided for use where an electric utensil is not desired.

In use the utensil 10, containing the ingredients to be cooked, is placed in the well 2 and the male connection 7 inserted into the female connection 5 and the rheostat 6 adjusted to the desired degree of heat to be attained in the utensil 10. When it is desired to remove the utensil 10, it is readily withdrawn from the well, by means of the inclined floor of the well, and when the contents thereof have been disposed of, the utensil may be cleaned and replaced in the well for storage. It is obvious, with this cooking unit, there are no burners to be cleaned and boilovers, and the like, may be easily cleaned from the stove top.

While the foregoing is considered the preferred embodiment of the invention, it is by way of illustration only, the broad principal of the invention being defined by the appended claims.

What is claimed is:

1. An electric cooking apparatus comprising in combination:
    (a) a housing consisting of a box-like structure on which is formed a table top having a series of utensil receiving wells,
    (b) said wells consisting of a bottom wall, a vertical back wall, vertical side walls, and having the front wall inclined at a predetermined angle for insertion of the utensil in said well,
    (c) a bar provided with female connections mounted on said table top adjacent said wells and connected to a source of electric power,
    (d) an electrically operated cooking utensil removably inserted in one of said wells and connected to said source of power,
    (e) said utensil having an electrical heating element supported therein and connected to a male connection adapted to be connected to one of said female connections when said utensil is in said wells.

2. The device defined in claim 1 wherein remote control rheostats are provided, said rheostat being in connection with the source of electric supply in said male receiving means in the said bar for control of the degree of heat to be attained by the respective utensils.

3. The device defined in claim 1 wherein one of said utensil receiving wells is provided with a standard electric burner seated on the floor thereof.

References Cited

UNITED STATES PATENTS

| 3,056,013 | 9/1962 | Hollerith | 219—432 |
| 1,084,877 | 1/1914 | Cary | 219—433 |

BERNARD A. GILHEANY, *Primary Examiner.*

H. B. GILSON, *Assistant Examiner.*

U.S. Cl. X.R.

219—433